United States Patent

Kuhn et al.

[11] Patent Number: 5,681,025
[45] Date of Patent: Oct. 28, 1997

[54] MOTOR OPERATED BUTTERFLY VALVE WITH A MULTI-FUNCTION SEAL

[75] Inventors: Weldon R. Kuhn, Elkhart Lake; John A. Fiumefreddo, Plymouth; Isadore Balan, Mequon; Kenneth J. Sieth, Delafield, all of Wis.

[73] Assignee: Kohler Co., Kohler, Wis.

[21] Appl. No.: 375,869

[22] Filed: Jan. 20, 1995

[51] Int. Cl.⁶ .................. F16K 31/04; H02P 1/22
[52] U.S. Cl. .............. 251/129.12; 251/287; 251/306; 318/294
[58] Field of Search ............ 251/129.11, 129.12, 251/284, 287, 306; 318/293, 294

[56] References Cited

U.S. PATENT DOCUMENTS

| | | | |
|---|---|---|---|
| 1,383,482 | 7/1921 | Popp | 251/306 X |
| 2,821,639 | 1/1958 | Bright et al. | 307/88.5 |
| 2,856,952 | 10/1958 | Stillwagon | 137/454.6 |
| 2,912,218 | 11/1959 | Stillwagon | 251/306 |
| 3,024,802 | 3/1962 | Stillwagon | 137/375 |
| 3,050,672 | 8/1962 | Alexanderson | 318/257 |
| 3,072,139 | 1/1963 | Mosites | 137/375 |
| 3,100,500 | 8/1963 | Stillwagon | 137/375 |
| 3,143,132 | 8/1964 | Pangburn | 137/375 |
| 3,496,441 | 2/1970 | Heider et al. | 318/257 |
| 3,531,083 | 9/1970 | Roher | 251/287 X |
| 3,567,186 | 3/1971 | Williams | 251/306 |
| 3,747,892 | 7/1973 | Gigantino et al. | 251/65 |
| 3,904,173 | 9/1975 | Naylor | 251/306 |
| 3,969,658 | 7/1976 | Htsui | 318/202 |
| 4,097,786 | 6/1978 | Lund | 318/282 |
| 4,099,704 | 7/1978 | Okumura et al. | 251/134 |
| 4,133,513 | 1/1979 | Meyer | 251/306 |
| 4,134,051 | 1/1979 | Pelchat et al. | 318/282 |
| 4,139,153 | 2/1979 | Engholdt | 236/78 |
| 4,148,458 | 4/1979 | Holtgraver | 251/306 X |
| 4,213,595 | 7/1980 | Sheppard | 251/308 |
| 4,319,171 | 3/1982 | Motoori | 318/379 |
| 4,364,111 | 12/1982 | Joez | 364/175 |
| 4,490,655 | 12/1984 | Feldman | 318/294 |
| 4,494,181 | 1/1985 | Ramlohr et al. | 363/63 |
| 4,510,965 | 4/1985 | Peroux et al. | 137/375 |
| 4,581,565 | 4/1986 | Van Pelt et al. | 318/294 |
| 4,583,709 | 4/1986 | Ward | 251/129.12 X |
| 4,620,835 | 11/1986 | Bell | 417/17 |
| 4,677,356 | 6/1987 | Tsuneda et al. | 318/258 |
| 4,774,750 | 10/1988 | Platusich | 29/157.1 R |
| 4,832,079 | 5/1989 | Nielson | 251/306 X |
| 4,910,443 | 3/1990 | Zylstra et al. | 318/294 |
| 4,978,898 | 12/1990 | Tsukahara et al. | 318/280 |
| 4,983,896 | 1/1991 | Sugiyama et al. | 318/286 |
| 5,029,811 | 7/1991 | Yamamoto et al. | 251/306 |
| 5,100,101 | 3/1992 | Shah | 251/129.12 X |
| 5,211,195 | 5/1993 | Hamos | 137/595 |
| 5,226,454 | 7/1993 | Cabalfin | 137/870 |
| 5,314,165 | 5/1994 | Raymond, Jr. et al. | 251/305 |
| 5,408,708 | 4/1995 | Mathis | 4/541.4 |

FOREIGN PATENT DOCUMENTS 793706  4/1958  United Kingdom .............. 251/287

*Primary Examiner*—John Rivell
*Attorney, Agent, or Firm*—Quarles & Brady

[57] ABSTRACT

A fluid valve has a housing formed by first and second halves which combine at mating surfaces to form a cavity with an inlet in the first half and an outlet in the second half. The mating surface of each half includes a notch extending between an outer edge of mating surface and the cavity, and includes an annular recess around the cavity. A pad is formed on each mating surface between the cavity and the annular recess, and has a groove that forms a bushing when the first and second units are connected. A butterfly valve member is located within the cavity and is mounted on a valve stem. The valve stem has an end that rides in the bushing and a portion that passes through the notches in the housing halves. An annular seal fits within the recesses to prevent fluid leakage between the two housing halves and also seals around the valve stem portion. In addition the butterfly valve member engages the seal in a closed state of the valve.

15 Claims, 3 Drawing Sheets

MOTOR OPERATED BUTTERFLY VALVE WITH A MULTI-FUNCTION SEAL

BACKGROUND OF THE INVENTION

The present invention relates to butterfly valves for controlling fluid flow; and more particularly to housing and seals used in such valves, as well as a motorized mechanism for operating the valve.

There already are known various constructions of butterfly valves and their housings. For instance, a common butterfly valve design includes a housing which can be coupled to two pipes to form a flow passage between those pipes. A transverse opening in the side wall of the valve housing extends along an axis that is substantially normal to the axis of the two pipes connected to the valve. A shaft or stem rotatably extends through the transverse opening and supports a butterfly valve disk within the flow passage. Rotating the shaft turns the butterfly valve disk through at least 90° about the transverse axis between open and closed positions of the valve.

The valve housing bounds a substantially cylindrical internal portion of the flow passage that is centered on the axis of the pipes and the butterfly valve disk is constructed to fit within that portion. A sealing means is provided around either the butterfly valve disk or the internal portion of the housing to seal the gap therebetween when the butterfly valve disk is positioned transversely within the flow passage to close the valve. Additional seals had to be provided to prevent water from leaking out of the valve housing along the shaft which operates the butterfly valve disk and for other openings in the housing.

Butterfly valves of this type have been proposed for regulating the flow of water in whirlpool baths. Such baths often include electrical control systems for activating different water jets and controlling the water flow rate. Thus it is desirable to develop a motor driven butterfly valve which can be electrically operated by the control system for a whirlpool bath. However, whereas in a manual valve the position of the internal butterfly valve disk is indicated by the location of the operating lever, the valve position is not easily determined in a motor operated valve. Therefore a mechanism is needed to ensure that the valve is properly placed into the fully open or fully closed position when such is commanded by the user.

Furthermore, where the electrical control system allows the motorized valve to be manually controlled by the bather operating a switch, continued closure of the switch after the valve has stopped in the fully opened or closed position can result in the motor overheating and even burning out. Therefore, it is also desirable to provide a control circuit which prevent such deleterious effects from occurring.

SUMMARY OF THE INVENTION

The general object of the present invention is to provide a new and improved valve for controlling the flow of fluids through a conductor.

Another object is to provide a butterfly valve which is easy to assemble.

A further object of the present invention is to provide a butterfly valve assembly which has a single sealing member which acts as a gasket between two halves of a valve housing, seals along a valve actuating shaft and provides a seal between the butterfly valve member and the housing in the closed state of the valve.

Yet another object is to provide bushing-like support for the valve actuating shaft which maintains the shaft accurately positioned within the valve housing for smooth operation of the butterfly valve member.

Still another object of the present invention is to provide a valve assembly that can easily be adapted for either motorized operation or manual operation.

Another object of particular significance in a motor operated valve of this type is to provide a mechanism which ensures that the butterfly valve member is rotated into the fully open or fully closed position as desired by the user. The preferred embodiment of the valve provides an internal stop against which the butterfly valve member abuts in the fully opened and closed positions of the butterfly valve member.

These and other objects are satisfied by a butterfly valve that comprises a housing formed by first and second units which abut at a mating interface. The abutting units form an internal cavity having an inlet in one housing unit and outlet in the other housing unit. A bushing is formed at the mating interface to one side of the internal cavity by aligned grooves in each of the housing units. A stem aperture extends from the internal cavity aligned with the bushing on an opposite side of the internal cavity.

A sealing member fits between the first and second housing units around the internal cavity and the bushing, and in communication with the internal cavity. The sealing member has an aperture aligned with the stem aperture in the housing.

A butterfly valve member is within the internal cavity of the housing. The butterfly valve member is attached to a valve stem that extends through the stem aperture in the housing and the aperture in the seal. An end of the valve stem fits into the bushing formed in the housing. Rotation of the valve stem, rotates the butterfly valve member between open and closed positions. In the closed position, the butterfly valve member engages the seal to prevent the flow of fluid through the valve.

A unique motor control circuit also is disclosed which limits the magnitude of current that is able to flow through the motor. This feature prevents the motor from overheating in the event that it continues to be powered after the butterfly valve member abuts the stop and the motor stops rotating. The motor control circuit also limits the motor stall torque reducing mechanical stress on the butterfly valve components as well as a motor driven gearbox.

DETAILED DESCRIPTION OF THE INVENTION

Figure 1:
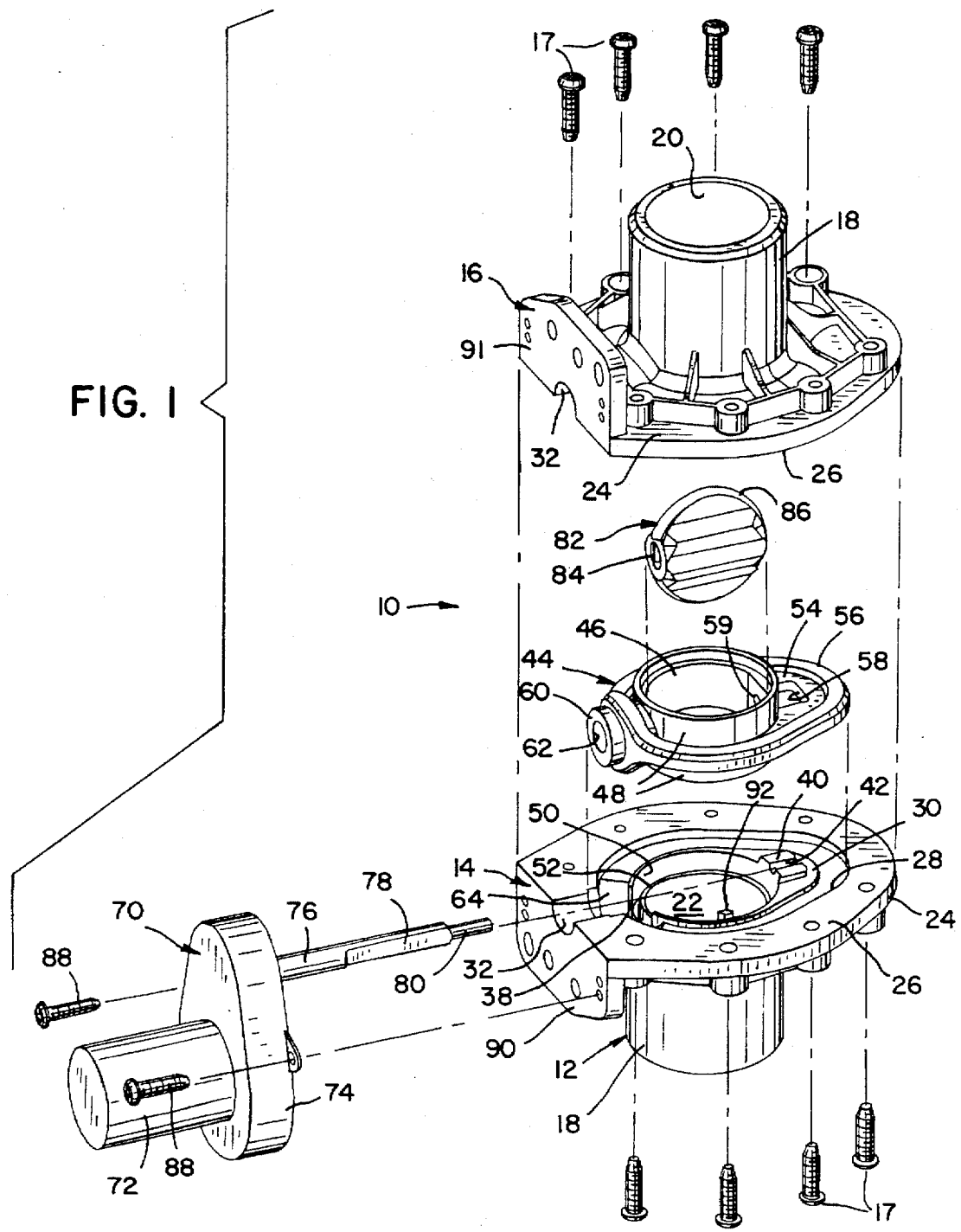
FIG. 1 is an exploded, perspective view of a motor operated valve according to the present invention.

With initial reference to FIG. 1, the butterfly valve 10 has a housing 12 divided in half to form two identical units 14 and 16 made of plastic, such as polyvinyl chloride (PVC). Each housing unit 14 and 16 has a tubular cylindrical portion 18 with an end that is adapted to be cemented to PVC pipes to provide an inlet and an outlet of the butterfly valve 10. Alternatively, pipe threads can be cut in the tubular portion 18 or other types of coupling mechanisms provided to attach the valve 10 between two pipes. The tubular portions 18 have a central passage 20 therethrough for the flow of fluid from one pipe to the other. A central cavity 22 is formed within the valve housing 12 at the interface between the two tubular portions 18 when the housing units 14 and 16 are joined together.

Each of the units 14 and 16 has a mounting flange 24 extending outwardly from and encircling the inner end of each tubular portion 18. Each flange 24 has a flat mating surface 26 which face each other when the housing units 14 and 16 are assembled together. A plurality of screws 17 pass through apertures in one housing unit and thread into corresponding apertures in the other housing unit to hold the housing 12 together.

Figure 2:
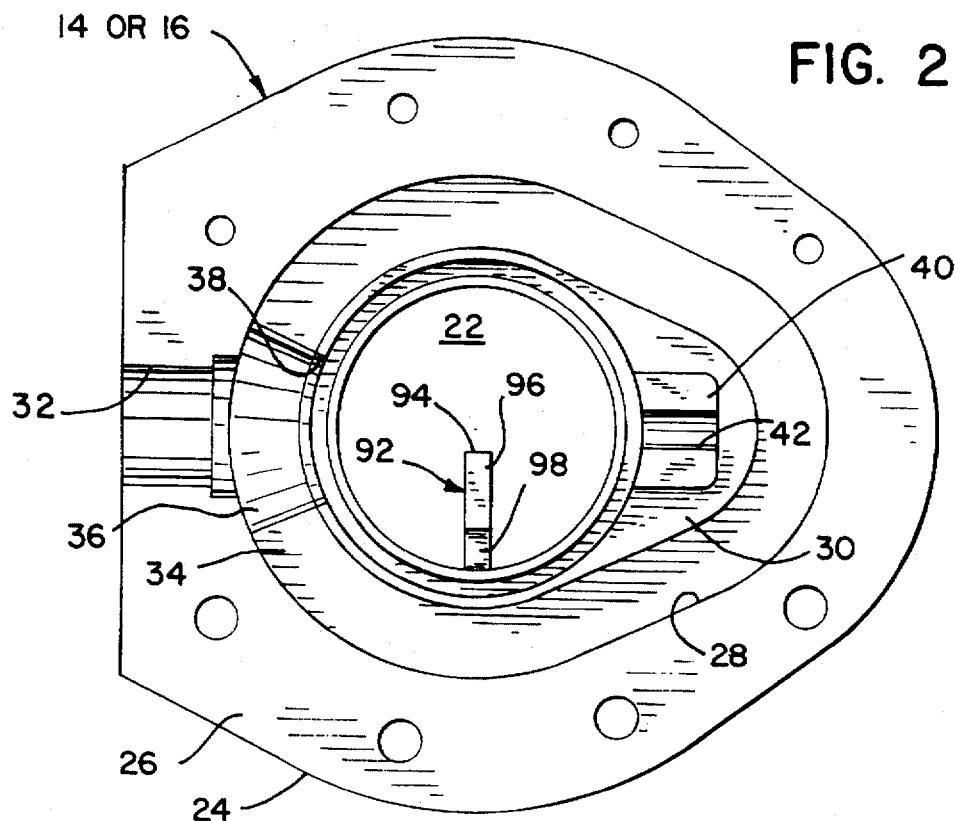
FIG. 2 is a plane view of the mating surface of halves of a valve housing shown in FIG. 1.

Referring to FIGS. 1 and 2, the mating surface 26 of the flange 24 has an annular recess 28 extending around the internal cavity 22. A raised island 30 is located within the recess and surrounds the central cavity 22 to provide a lip around the cavity. A pad 40 rises from a major surface of island 30 so that a flat raised surface of the pad 40 is coplanar with the mating surface 26 of flange 24. A semi-cylindrical groove 42 is formed in the upper surface of pad 40 and has a longitudinal axis that intersects the longitudinal axis of the tubular cylindrical portion 18.

A semi-cylindrical notch 32 is formed in the mating surface 26 of flange 24 on the opposite side of the internal cavity 22 from the pad 40. Notch 32 extends between the annular recess 28 and the outer surface of the housing 12, and has a longitudinal axis that is aligned with the axis of the groove 42 on pad 40. The inner surface 34 of annular recess 28 has a semi-cylindrical depression 36 which is coaxial with the notch 32. A similar aligned depression 38 is located in the rim formed by island 30. When the two units 14 and 16 are attached to each other, the pair of notches 32 and pairs of depressions 34 and 38 form aligned apertures for receiving a valve actuating stem, as will be described.

With reference to FIG. 1, a seal 44 is fabricated of a resilient material and fits within the annular recess 28 in the housing units 14 and 16. The seal 44 has a central tubular section 46 located within the cavity 22 of the housing 12 with outer surfaces 48 tightly engaging cavity wall 50 in each housing unit 14 and 16. Ends of the tubular section 46 fit into a groove between surface 50 and a lip 52 in each housing unit where the tubular portion 18 communicates with the internal cavity 22. This fit of the tubular section 46 of seal 44 tightly seals the two tubular sections 18 of each housing unit 14 and 16 together and defines a fluid flow passage through the valve housing 12.

The seal 44 also has a gasket flange 54 extending outwardly around the midpoint of the tubular portion 46 with a sealing lip 56 around the outer perimeter of the gasket flange. When the seal 44 is placed between the two housing units 14 and 16, the gasket flange 54 extends over and is in contact with the major surface of islands 30 in each unit. The lip 56 of the sealing flange 54 is compressed between inner surfaces 34 of the annular recesses 28 in the housing units 14 and 16 thereby providing a watertight seal therebetween. The sealing flange 54 has a rectangular aperture 58 therethrough for receiving the pads 40 that project of each island 30. The remainder of the sealing flange, and in particular lip 56, around the rectangular aperture 58 to seal the interface between units 14 and 16 hereby preventing water leakage from the valve cavity 22 through the aperture 58 in the seal. A hole 59 extends through the seal tubular portion 46 aligned with the rectangular aperture 58.

A tube 60 extends transversely outward from the tubular portion 46 of seal the 44 through flange 54. The tube 60 is diametrically opposed to the hole 59 and has a central hole 62 that is aligned with hole 59. The flange lip 56 extends around the tube 60. In the assembled device, tube 60 of seal 44 fits into a portion of notch 32 in the flange of each unit of the valve housing 12. The portion of seal flange lip 56, which extends around the tube 60, fits within a cylindrical depression 64 in the annular recess 28 to provide a tight seal between the two housing units 14 and 16 at the notch 32.

The valve 10 is operated by a motor drive mechanism 70 attached by machine screws 88 to a mount 90 on the flange 24 of one housing unit 14. Because the two housing units 14 and 16 are identical, the other housing unit 16 has a similar mount 91 which is not utilized to attach the motor drive mechanism 70. The motor drive mechanism 70 has a permanent magnet, DC electric motor 72 connected to a gear assembly 74 that produces rotation of a valve stem 76. The valve stem has a flat longitudinal surface 78 and a smaller diameter tip 80.

When the valve 10 is assembled, valve stem 76 is inserted through the notches 32 in the valve units 14 and 16 and tightly through the holes 62 and 59 in the seal 44. The valve stem passes through an aperture 84 in a disk-shaped butterfly valve member 82 located inside the tubular portion 46 of the seal. The aperture 84 has a flat inner wall which mates with the flat surface 78 on the valve stem 76 so that the two components rotate together about the axis of the valve stem. The tip 80 of the valve stem 76 projects from the other side of the butterfly valve member 82 into grooves 42 in the pads 40 of each housing unit 14 and 16. The grooves 42 in housing pads 40 form a bushing that supports the stem tip 80 and prevents the valve stem 76 from moving transversely in any direction. Thus, the valve stem is firmly supported within the valve housing 12 by the grooves 42 at the stem tip 80.

When the motor 72 is energized, the valve stem 76 rotates which produces corresponding rotation of the disk-shaped butterfly valve member 82 within the cylindrical, tubular portion 46 of seal 44. The butterfly valve member 82 is able to rotate through 90° which movement is limited by a stop 92 located within cavity 22 of the valve housing 12 as best shown in FIG. 2. In the closed position of the valve 10, the butterfly valve member 82 extends transversely across the inner opening within tubular portion 42 of the valve seal 44 so that the peripheral edge 86 of the butterfly valve member is in continuous contact with the valve seal 44. The inner opening of the tubular portion 46 of the seal is slightly smaller in diameter than the outer diameter of the butterfly valve member so that the valve member perimeter 86 tightly engages the resilient seal to prevent water from leaking around the valve member 82. The closed position of the valve member is defined by a first surface 96 of the stop 92. Specifically, a major surface of the butterfly valve member 82 contacts first surface 96 of the stop when the valve is in the closed state.

To fully open the valve 10, the butterfly valve member 82 is rotated 90° from the closed position so that fluid is able to flow on either side of the butterfly valve member. In this fully open state, the major surface of the butterfly valve member 82 abuts second surface 94 of stop 92 within the valve housing 12. Thus, stop 92 aids the motorized drive mechanism 70 in properly positioning the butterfly valve member 82 in both the fully opened and fully closed states. However, the butterfly valve member can be placed at any position between fully open and fully closed. It should be noted that the stop 92 has a notch 98 adjacent the interior wall of the cavity 22 for receiving the tubular portion 46 of seal 44.

The seal 44 serves three functions. It acts as a gasket providing a watertight seal between the two units 14 and 16 of housing 12. To perform this function, the seal lip 56 extends around the pads 40 which form a bushing for the tip 80 of the valve stem, thus preventing leakage of the fluid past the tip of the valve stem and through the valve housing. The seal 44 also prevents water from flowing along the portion of the valve stem 76 which passes through notches 32 on the other side of the valve housing 12. In addition, the seal 44 provides a watertight seal around the edge 86 of the butterfly valve member 82 in the closed state of the valve.

Figure 3:
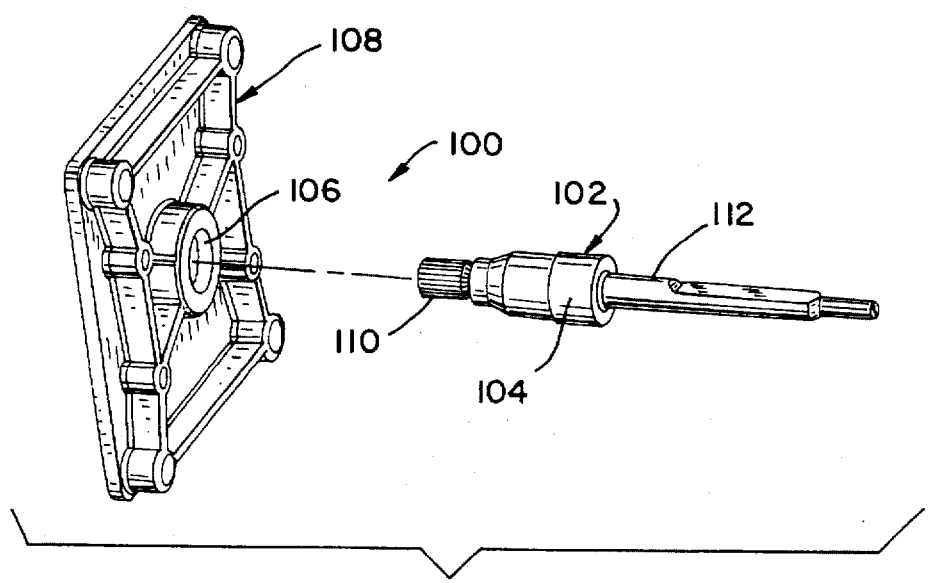
FIG. 3 is an exploded, perspective view of components which convert the valve shown in FIG. 1 for manual operation.

Alternatively, the motor drive mechanism 70 and its valve stem 76 can be replaced with a manual operating mechanism 100 shown in FIG. 3. This manual operating mechanism 100 has a valve stem 102 has a central portion 104 which is held within an aperture 106 of a retainer plate 108 that is attached by machine screws to the mounts 90 and 91 of the two housing units 14 and 16, shown in FIG. 1. An end of the valve stem 102, which projects from the exterior of retainer plate 108, has a plurality of spines 110 suitable for attachment of a handle or lever (not shown) for manual operation of the valve 10. The opposite end of the manual valve stem 102 has a shaft 112 which extends into the valve housing 112 and engages the butterfly valve member 82 in the same manner as the stem 76 for the motor drive mechanism 70. Thus, the same valve housing 12 and its internal components can be utilized with either motorized or manual operators.

Figure 4:
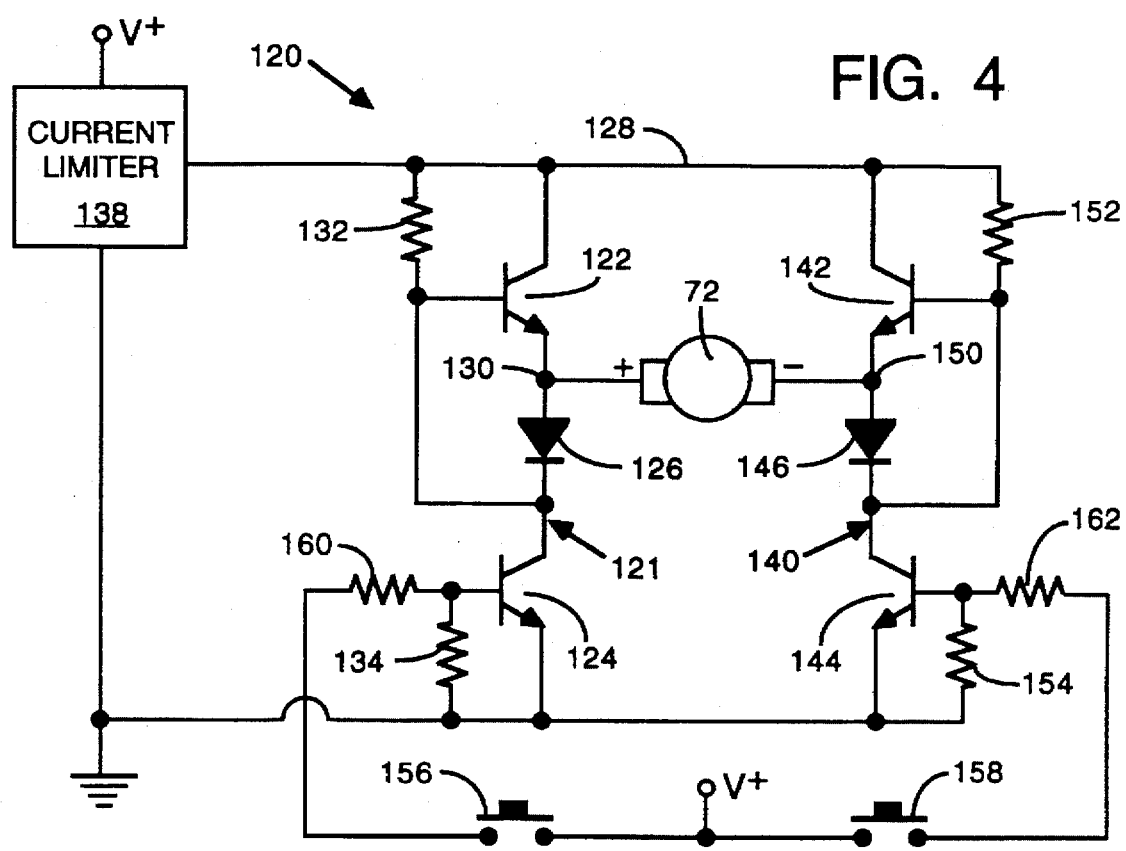
FIG. 4 is a schematic diagram of a novel circuit for controlling the electric motor which operates the valve.

When a motorized operator is employed, the permanent magnet, DC electric motor 72 is driven by an improved H-bridge control circuit 120 shown in FIG. 4. The H-bridge is supplied with current from a positive voltage bus 128 which is fed by the output of a current limiter 138 coupled to a source of positive voltage $V^+$ and to ground. The control circuit 120 comprises a first branch 121 having a pair of NPN transistors 122 and 124 connected in series with a diode 126 therebetween. Specifically, first NPN transistor 122 has a collector connected to positive voltage bus 128 and an emitter coupled at a first node 130 to the anode of the diode 126. The cathode of diode 126 is coupled to the collector of second transistor 124 which has an emitter connected to circuit ground. The base of the first transistor 122 is coupled to the positive voltage bus 128 by resistor 132 and is directly connected to the collector of second transistor 124. As used herein, the terms "directly connected" and "directly coupled" refer to a connection between two elements by only a conductor, and not by an active device or a passive device which provides a non-negligible resistance or reactance. The base of the second transistor 124 is coupled to ground by resistor 134.

The control circuit 120 includes a second branch 140 having another pair of NPN transistors 142 and 144 connected in series with a diode 146 therebetween. The second branch 140 is identical to the first branch 121. Specifically, the collector of third NPN transistor 142 is connected to the positive voltage bus 128 and the emitter is coupled at a second node 150 to the anode of diode 146. The cathode of diode 146 is connected to the collector of fourth transistor 144 which has an emitter connected to circuit ground. The base of the third transistor 142 is coupled to the positive voltage bus 128 by resistor 153 and is directly connected to the collector of the fourth transistor 144. The base of the second transistor 144 is coupled to ground by resistor 154.

The positive terminal of the permanent magnet, DC motor 72 is connected to the first node 130 and the motor's negative terminal is connected to the second node 150. The motor 72 is operated by pressing one of first and second push button switches 156 or 158. The particular push button switch 156 or 158 which is closed determines the direction that the motor 72 rotates and thus whether the butterfly valve 10 opens or closes. The first push button switch 156 is connected in series with resistor 160 between the source of positive voltage $V^+$ and the base of the second transistor 124. The second push button switch 158 is connected in series with a different resistor 162 between the source of positive voltage $V^+$ and the base of the fourth transistor 144.

As noted previously the butterfly valve 10 has particular application is controlling the amount of water that flows through nozzles in a whirlpool tub. When second push button switch 158 is closed by a bather, a positive voltage is applied to the base of the fourth transistor 144 which turns on. When this occurs, the base of the third transistor 142 is pulled down to approximately ground potential turning that transistor off. It should be noted that when the second transistor 124 is non-conductive the base of the first transistor 122 is biased to the potential of the positive voltage bus 128 and is conductive. Therefore, assuming that the first push button switch 156 is open, the first transistor 122 will be in a conductive state enabling current to flow from the positive voltage bus 128 through the motor 72 and the fourth transistor 144 to ground. This current causes the motor 72 to rotate the butterfly valve member 82 in one direction to open valve 10 further, for example.

When the bather closes only the first push button switch 156, a positive voltage is applied to the base of the second transistor 124 which turns on. This applies approximately ground potential to the base of the first transistor 122 which turns off. As a result, current flows from the positive voltage bus 128 through the third transistor 142, motor 72 and the second transistor 124 to ground. This current causes the motor 72 to rotate the valve in a reverse direction to close the butterfly valve member 82 further, for example.

Regardless of which push button switch 156 or 158 is closed, the electric motor 72 will continue to rotate until the butterfly valve member 82 strikes the stop 92 shown in FIG. 1. When the motor 72 ceases turning, the electric current through it begins to increase if the bather keeps the pushbutton switch closed. The increased current magnitude produces heat in the motor that can cause the motor to burn out if the current rises unchecked. To prevent such deleterious effects from occurring, the current limiter 138 regulates the magnitude of current which can flow through the motor 72 to a safe level that does not overheat the motor.

The control circuit 120 also prevents simultaneous closure of both push button switches 156 and 158 from creating a short circuit through the H-bridge that bypasses the motor 72. Because the bases of the first and third transistors 122 and 142 are connected to the collectors of the second and fourth transistors 124 and 144, respectively, both transistors in the same branch 121 or 140 of the H-bridge cannot be conductive at the same time. As noted above, when the second transistor 124 is turned on by first push button switch 156, the base of the first transistor 122 is clamped to near ground potential turning off the first transistor. When second push button switch 158 closes and turns on the fourth transistor 144, the third transistor held off in a similar manner. Thus if the user simultaneously closes the push button switches 156 and 158, both the first and third transistors 122 and 142 become non-conductive, blocking any current from flowing through the H-bridge. Therefore, with both the first and second push button switches closed, current can not flow directly through each branch 121 and 140 bypassing motor 72.

We claim:

1. A butterfly valve comprising:

a housing formed by first and second units which abut at a mating interface, and having an internal cavity with an inlet formed in the first housing unit and outlet formed in the second housing unit, a bushing formed on one side of the internal cavity by aligned grooves in each of the first and second units, and a stem aperture aligned with the bushing on an opposite side of the internal cavity from the one side;

a seal between the first and second units in communication with the internal cavity, and extending around the internal cavity and the bushing, said seal having an aperture aligned with the stem aperture in said housing;

a butterfly valve member within the internal cavity of said housing and having an aperture therethrough, said butterfly valve member having an edge the engages said seal in a closed state of the butterfly valve; and a valve stem extending through the stem aperture in said housing, the aperture in said seal and the aperture of said butterfly valve member, said valve stem having a portion that extends into the bushing formed in said housing.

2. The butterfly valve as recited in claim 1 wherein at least one of the first and second units of said housing has a stop member that extends into the internal cavity, wherein said stop member limits rotational movement of said butterfly valve member and thereby defines a fully open state and a fully closed state of the butterfly valve.

3. The butterfly valve as recited in claim 2 further comprising:

an electric motor coupled to said valve stem to produce rotational movement of said butterfly valve member between the fully open state and the fully closed state; and a control circuit for selectively applying electric current to said electric motor, and having a current limiter that prevents the electric current applied to said electric motor from exceeding a predefined magnitude when said butterfly valve member abuts the stop member.

4. The butterfly valve as recited in claim 3 wherein said control circuit further comprises:

a power supply bus which is connected to receive electric current from the current limiter;

a ground terminal;

a first branch with a first transistor and a second transistor, each of the first transistor and a second transistor having an emitter-collector conduction path connected in series between said power supply bus and said ground terminal with a first node between the first transistor and a second transistor;

a second branch with a third transistor and a fourth transistor, each of the third transistor and a fourth transistor having an emitter-collector conduction path connected in series between said power supply bus and said ground terminal with a second node between the third transistor and a fourth transistor;

a first bias resistor connected between said power supply bus and a base electrode of the first transistor, and the base of the first transistor also being connected to a collector of the second transistor;

a second bias resistor connected between said power supply bus and a base electrode of the third transistor, and the base of the third transistor also being connected to a collector of the fourth transistor; and means for applying a bias potential selectively to a base of the second transistor to produce rotation of said electric motor in a first direction and to a base of the fourth transistor to produce rotation of said electric motor in a second direction.

5. The butterfly valve as recited in claim 1 wherein said housing has a recess formed in both the first and second units at the mating interface and extending around the internal cavity; and wherein said seal has a lip that extends into the recess.

6. The butterfly valve as recited in claim 1 wherein said housing includes first and second stop surfaces which limit rotational movement of said butterfly valve member, wherein said butterfly valve member abuts the first stop surface in a fully open state of the butterfly valve and abuts the second stop surface in a fully closed state of the butterfly valve.

7. The butterfly valve as recited in claim 1 wherein each of the first and second units has a pad with a groove in an exposed surface, wherein the pads of the first and second units combine to form the bushing in the housing and wherein said valve stem is received in the groove of each pad.

8. The butterfly valve as recited in claim 1 wherein at least one of said first and second housing units has a mount formed thereon; and further comprises a motor attached to the mount, and coupled to said valve stem to produce rotational movement thereof.

9. The butterfly valve as recited in claim 1 wherein at least one of said first and second housing units has a mount formed thereon; and further comprises retainer plate attached to the mount and having an aperture through which said valve stem extends.

10. A butterfly valve comprising:

first and second housing units which abut at a mating interface, each of said first and second housing units having a tubular portion with a first end for attaching to a fluid conduit and a second end with an flange projecting outward therefrom, the flange has a mating surface formed thereon with an opening in communication with the tubular portion, the mating surface includes a notch extending between an edge of the flange and the opening and includes an annular recess extending around the opening, a pad is on the mating surface between the opening and the annular recess and has a groove which forms a bushing when the first and second units are connected;

a seal having a tubular section that cooperates with the tubular portions of the first and second housing units to form a fluid flow passage through the butterfly valve, a sealing flange projecting from the tubular section into the recess in the first and second housing units wherein the sealing flange has a pad opening in which each pad is received, said seal having a first aperture aligned with the notch in said first and second housing units and a second aperture extending through the tubular section in communication with the pad opening;

a butterfly valve member within the tubular section of said seal and having an aperture therethrough; and a valve stem extending along the notch in the both the first and second housing units, through the first and second apertures of said seal, through the aperture in said butterfly valve member, and into the groove in the pad.

11. The butterfly valve as recited in claim 10 wherein said first and second housing units have first and second stop surfaces which limit rotational movement of said butterfly valve member, wherein butterfly valve member abuts the first said stop surface in a fully open state of the butterfly valve and abuts the second stop surface in a fully closed state of the butterfly valve.

12. The butterfly valve as recited in claim 10 wherein at least one of said first and second housing units has a stop member that extends into the tubular section of said seal and limits movement of said butterfly valve member, wherein said butterfly valve member abuts said stop member in fully open and fully closed states of the butterfly valve.

13. The butterfly valve as recited in claim 10 wherein at least one of said first and second housing units has a mount formed on the flange; and further comprises a motor drive mechanism attached to the mount, and coupled to said valve stem to produce rotational movement thereof.

14. The butterfly valve as recited in claim 10 wherein at least one of said first and second housing units has a mount formed on the flange; and further comprises retainer plate attached to the mount and having an aperture through which said valve stem extends.

15. The butterfly valve as recited in claim 10 wherein the sealing flange of said seal has an edge with a lip extending around the sealing flange at the edge.

* * * * *